(12) United States Patent
Feshali et al.

(10) Patent No.: US 11,371,843 B2
(45) Date of Patent: Jun. 28, 2022

(54) INTEGRATION OF PHOTONICS OPTICAL GYROSCOPES WITH MICRO-ELECTRO-MECHANICAL SENSORS

(71) Applicant: Anello Photonics, Inc., Santa Clara, CA (US)

(72) Inventors: Avi Feshali, Los Angeles, CA (US); Mike Horton, Santa Clara, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 17/365,331

(22) Filed: Jul. 1, 2021

(65) Prior Publication Data

US 2022/0003551 A1 Jan. 6, 2022

Related U.S. Application Data

(60) Provisional application No. 63/047,504, filed on Jul. 2, 2020.

(51) Int. Cl.
| | |
|---|---|
| *G01C 19/72* | (2006.01) |
| *G02B 6/126* | (2006.01) |
| *G02B 6/12* | (2006.01) |
| *G02B 6/125* | (2006.01) |
| *G02B 6/132* | (2006.01) |

(52) U.S. Cl.
CPC ........... *G01C 19/721* (2013.01); *G02B 6/125* (2013.01); *G02B 6/132* (2013.01); *G02B 2006/12061* (2013.01); *G02B 2006/12138* (2013.01)

(58) Field of Classification Search
CPC .... G01C 19/721; G01C 19/132; G02B 6/125; G02B 6/132; G02B 2006/12138

USPC .......................................................... 385/131
See application file for complete search history.

(56) References Cited

U.S. PATENT DOCUMENTS

| | | | |
|---|---|---|---|
| 4,630,885 A | 12/1986 | Haavisto | |
| 10,731,988 B1 | 8/2020 | Paniccia et al. | |
| 10,969,548 B2 | 4/2021 | Paniccia et al. | |
| 2002/0180416 A1* | 12/2002 | Dyott | G01R 15/246 324/96 |
| 2004/0017974 A1 | 1/2004 | Balch et al. | |
| 2005/0158002 A1 | 7/2005 | Kubby et al. | |
| 2008/0226929 A1 | 9/2008 | Chung et al. | |
| 2009/0046294 A1 | 2/2009 | Kaplan | |
| 2011/0051144 A1* | 3/2011 | Wilfinger | G01C 21/16 356/459 |

(Continued)

OTHER PUBLICATIONS

PCT International Search Report and Written Opinion for International Application No. PCT/US2021/040286 dated Oct. 20, 2021, 11pages.

(Continued)

*Primary Examiner* — Kaveh C Kianni
(74) *Attorney, Agent, or Firm* — Lowenstein Sandler LLP; Madhumita Datta

(57) ABSTRACT

Aspects of the present disclosure are directed to monolithically integrating an optical gyroscope fabricated on a planar silicon platform as a photonic integrated circuit with a MEMS accelerometer on the same die. The accelerometer can be controlled by electronic circuitry that controls the optical gyroscope. Gaps may be introduced between adjacent waveguide turns to reduce cross-talk and improve sensitivity and packing density of the optical gyroscope.

12 Claims, 9 Drawing Sheets

(56) References Cited

U.S. PATENT DOCUMENTS

| | | | |
|---|---|---|---|
| 2012/0251041 A1 | 10/2012 | Ishikawa | |
| 2014/0202786 A1* | 7/2014 | Beal | G01V 1/18 181/122 |
| 2015/0316580 A1* | 11/2015 | Hutchison | G01D 5/268 250/227.14 |
| 2016/0349283 A1 | 12/2016 | Bramhavar et al. | |
| 2020/0175851 A1* | 6/2020 | Serban | G08G 1/143 |
| 2021/0116246 A1 | 4/2021 | Paniccia et al. | |
| 2021/0361177 A1* | 11/2021 | Shah | A61B 5/681 |

OTHER PUBLICATIONS

L Wen et al., "Design and characterization of a CMOS compatible poly-SiGe lowg capacitive accelerometer", https://www.sciencedirect.com/science/article/pii/S1877705810007629, ScienceDirect, Procedia Engineering, Proc. Eurosensors XXIV, Sep. 5-8, 2010, Linz, vol. 5, 2010, pp. 742-745, Austria.

* cited by examiner

INTEGRATION OF PHOTONICS OPTICAL GYROSCOPES WITH MICRO-ELECTRO-MECHANICAL SENSORS

RELATED APPLICATIONS

This application is related to and claims the benefit of U.S. Provisional Patent Application No. 63/047,504, filed Jul. 2, 2020, titled "Integration of Photonics Optical Gyroscopes with Micro-Electro-Mechanical Sensors," the entirety of which is incorporated herein by reference.

TECHNICAL FIELD

The present disclosure relates to various structures and fabrication methods for integrating photonics-based optical gyroscopes with micro-electro-mechanical systems (MEMS)-based sensors on a same chip. In other words, this disclosure relates to a photonics integrated circuit (PIC) (also referred to as integrated photonics chip in the claims) with a MEMS-based sensor integrated monolithically to the chip.

BACKGROUND

Gyroscopes (sometimes also referred to as "gyros") are sensors that can measure angular velocity. Gyroscopes can be mechanical or optical, and can vary in precision, performance cost and size. Mechanical gyroscopes based on Coriolis effect typically have lower cost, but cannot deliver a very high performance, and are susceptible to measurement errors induced by temperature, vibration and electromagnetic interference (EMI). Optical gyroscopes typically have the highest performance and rely on interferometric measurements based on the Sagnac effect (a phenomenon encountered in interferometry that is elicited by rotation). Since optical gyroscopes do not have any moving parts, they have advantages over mechanical gyroscopes as they can withstand effects of shock, vibration and temperature variation much better than the mechanical gyroscopes with moving parts.

The most common optical gyroscope is the fiber optical gyroscope (FOG). Construction of a FOG typically involves a long loop (the loop may constitute a coil comprising several turns or a fiber spool) of polarization-maintaining (PM) fiber. Laser light is launched into both ends of the PM fiber traveling in different directions. If the fiber loop/coil is rotating, the optical beams experience different optical path lengths with respect to each other. By setting up an interferometric system, one can measure the small path length difference that is proportional to the area of the enclosed loop and the angular velocity of the rotating coil.

FOGs can have very high precision, but at the same time, they are of large dimension, are very expensive, and are hard to assemble due to the devices being built based on discrete optical components that need to be aligned precisely. Often, manual alignment is involved, which is hard to scale up for volume production. The present disclosure provides a solution to this problem, as described further below.

A plurality of gyroscopes and other sensors (such as accelerometers, and in some cases magnetometers) may be packaged together as an Inertial Measurement Unit (IMU) in a moving object to sense various motion parameters along the X, Y, and Z axes. For example, a 6-axis IMU may have 3-axis accelerometers and 3-axis gyroscopes packaged together to measure an absolute spatial displacement of the moving object. Applications of IMUs include, but are not limited to, military maneuvers (e.g., by fighter jets, submarines), commercial aircraft/drone navigation, robotics, autonomous vehicle navigation, virtual reality, augmented reality, gaming etc.

Present inventors propose replacing fibers with waveguide based integrated photonics components for cost-effective easy integration on a semiconductor platform which is much more promising for volume production of gyroscopes. This application describes various structures including silicon nitride (SiN) waveguide cores fabricated on a silicon platform, and integration of a MEMS accelerometer onto the same silicon platform where the gyroscope is, as elaborated below.

SUMMARY

Aspects of the present disclosure are directed to monolithically integrating an optical gyroscope fabricated on a planar silicon platform as a photonic integrated circuit with a MEMS accelerometer on the same die. The accelerometer can be controlled by electronic circuitry that controls the optical gyroscope. Gaps may be introduced between adjacent waveguide turns to reduce cross-talk and improve sensitivity and packing density of the optical gyroscope.

Specifically, an integrated photonics chip is disclosed, comprising: a waveguide coil comprising a plurality of waveguide turns looping around a central area enclosed by the waveguide coil, each waveguide turn being parallel to adjacent waveguide turns, wherein the waveguide coil is used as a rotational sensing element of an optical gyroscope; and, a micro-electro-mechanical-systems (MEMS)-based motion sensing device monolithically integrated in the central area enclosed by the waveguide coil, wherein the waveguide coil and the MEMS accelerometer are fabricated on a common platform.

The optical gyroscope and the MEMS-based motion sensing device are packaged together as a modularized integrated inertial measurement unit (IMU). The MEMS-based motion sensing device provides coarse rotational sensing reading for all axes of motion, and the optical gyroscope can provide a higher-precision rotational sensing reading for one or more selected axes of motion.

The MEMS-based motion sensing device can also comprise an accelerometer for one or more axes of motion. In some embodiments the MEMS device can be a six-axis gyroscope and accelerometer.

The common platform of the integrated photonics chip can be a silicon photonics platform, wherein each waveguide turn comprises a waveguide core sandwiched between an upper cladding and a lower cladding. In one embodiment, the waveguide core comprises silicon nitride and the upper cladding and lower cladding comprise oxide.

Structural modification can be introduced on either side of each waveguide turn to reduce crosstalk between the adjacent waveguide turns, thereby increasing a spatial density of waveguide turns that can be fabricated within a predetermined area of the integrated photonics chip.

The predetermined area may depend on an exposure field of a reticle used to fabricate the waveguide coil and the MEMS-based motion sensing device. Increasing spatial density of waveguide turns increases the central area enclosed within the waveguide coil, as well as increases a number of waveguide turns enclosing the central area, thereby increasing sensitivity of the rotational sensing element.

The structural modification may comprise a gap, wherein the gap comprises an air gap, a gap filled with metal, or, a gap filled with an inert gas or liquid.

In some embodiments the gap is in the form of a high-aspect-ratio rectangular slit or trench with a longitudinal dimension of the gap being substantially higher than a lateral dimension of the gap, such that the gap extends substantially above and below the waveguide core along the longitudinal direction.

Also disclosed is a method for monolithically fabricating an integrated photonics chip comprising a waveguide coil and a MEMS-based motion sensing device on a common platform, the method comprising: designating a central area on the common platform to fabricate the MEMS-based motion sensing device, wherein the central area is to be enclosed by the waveguide coil that comprises a plurality of waveguide turns looping around the central area, each waveguide turn being parallel to adjacent waveguide turns, wherein the waveguide coil is used as a rotational sensing element of an optical gyroscope; fabricating the waveguide coil on the common platform; protecting the fabricated waveguide coil by depositing an etch-stop layer above the waveguide coil; and, fabricating the MEMS-based motion sensing device in the designated central area.

Fabricating the MEMS-based motion sensing device further comprises: depositing and patterning electrodes on top of the etch-stop layer in the designated central area; depositing and patterning a first sacrificial layer on top of the etch-stop layer and the patterned electrodes; depositing and patterning a structural layer on top of the patterned sacrificial layer and the patterned electrodes; depositing and patterning a second sacrificial layer on top of the patterned structural layer; patterning the structural layer to create columns as parts of the MEMS-based motion sensing device, wherein the second sacrificial layer also gets patterned on top of the columns; and, removing the first and the second sacrificial layers, thereby creating a suspending structure that acts as a motion sensing element of the MEMS-based device.

The method may further comprise forming gaps on either side of each waveguide turn to reduce crosstalk between the adjacent waveguide turns, thereby increasing a spatial density of waveguide turns that can be fabricated within a predetermined area of the integrated photonics chip.

The integrated photonics chip can have multiple layers or planes, and portions of the photonics components can be distributed among the multiple planes. This way the total footprint of the photonics chip can remain small, but more functionalities can be packed into the photonics chip, as well as more length of the waveguide coil can be introduced without increasing the device footprint.

BRIEF DESCRIPTION OF THE DRAWINGS

The present disclosure will be understood more fully from the detailed description given below and from the accompanying drawings of various implementations of the disclosure.

Specifically, FIG. 2A shows the cross-sectional view at the starting point of a MEMS-SiPhOG integration process flow.

FIG. 2B shows an additional layer of SiN formed on top of the oxide layer acting as the lower cladding.

FIG. 2C shows a sacrificial layer deposited and patterned on top of the etch stop layer and the patterned electrodes.

FIG. 2D shows a structural layer deposited and patterned on top of the patterned sacrificial layer and electrodes.

FIG. 2E shows a second sacrificial layer deposited and patterned on top of the structural layer.

FIG. 2F shows patterning of the structural layer to create columns within the area designated for the MEMS accelerometer.

DETAILED DESCRIPTION

Aspects of the present disclosure are directed to monolithic integration of compact ultra-low loss integrated photonics-based waveguides with micro-electro-mechanical system (MEMS)-based sensing devices. These waveguides can be used as optical elements on a planar photonic integrated circuit (PIC), for example, in photonics integrated optical gyroscopes. As discussed in the background section, the key to fiber-based optical gyroscopes' high performance is the long length of high quality, low loss, optical fiber that is used to measure the Sagnac effect. The present inventors recognize that with the advent of integrated silicon photonics suitable for wafer scale processing, there is an opportunity to replace FOGs with smaller integrated photonic chip solutions without sacrificing performance. Photonics based optical gyros have reduced size, weight, power and cost, but in addition can be mass produced in high volume, are immune to vibration and electromagnetic interference and have the potential to offer performances equivalent to FOGs. When integrated optical gyroscope is fabricated on a silicon platform, it is abbreviated as SiPhOG® (Silicon Photonics Optical Gyroscope). This disclosure moves one step more towards bringing sensing elements together by monolithically integrating a MEMS accelerometer into the photonics gyroscope chip.

One key element of this integrated photonic solution is to produce very low loss waveguide core made of silicon nitride ($Si_3N_4$) surrounded by oxide or fused silica claddings. The whole waveguide structure (including core and cladding) is sometimes referred to as SiN waveguide for simplicity. The propagation loss in the SiN waveguides can be well below 0.1 db/meter. This is a vast improvement over the current state-of-the-art SiN process with propagation loss in the range of 0.1 db/centimeter.

Figure 1:
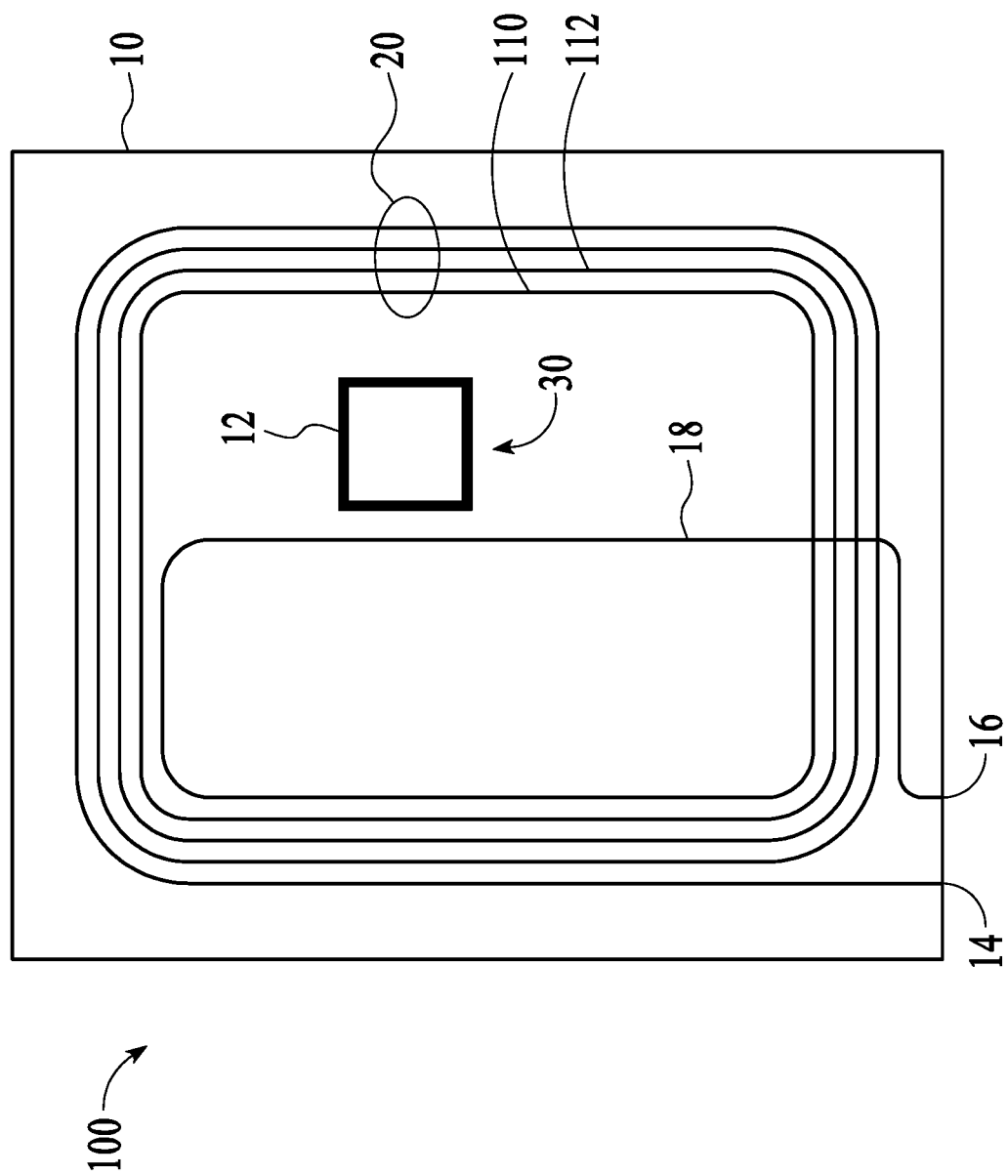
FIG. 1 is a schematic top view of an optical gyroscope coil (also called a waveguide coil) with multiple turns and a MEMS accelerometer on the same die, according to an embodiment of the present disclosure.

FIG. 1 shows a SiPhOG®-MEMS combined system 100 fabricated on a gyroscope waveguide die 10. Light is launched at a first end 14 of a gyroscope waveguide coil 20 with several turns. Here only four turns are shown for clarity, though in a real device, many more turns (for example, several hundreds of turns) can be used, based on the required sensitivity of the gyroscope. After propagating in the waveguide coil, light comes out from a second end 16. Note that since light can be launched from either end 14 or 16, each of the ends can act as an "input" end or an "output end". For simplicity, we refer to first end 14 as "input end" and second end 16 as "output end", and refer to the portion 18 of the waveguide closer to the second end 16 as "output waveguide" 18. In some embodiments, light can be launched at both ends 14 and 16 to obtain phase difference signal from counter-propagating light beams. Waveguide coil design takes into account phase interference between counter-propagating beams and/or cross-coupling between adjacent waveguides, such as between 110 and 112. An accelerometer device 30 is integrated on the gyroscope waveguide die 10. In one embodiment, an accelerometer die 12 containing the MEMS accelerometer device 30 can be hybridly integrated onto the gyroscope waveguide die 10. For example, a predecessor of this present disclosure is titled, "INTEGRATED PHOTONICS OPTICAL GYROSCOPES OPTIMIZED FOR AUTONOMOUS TERRESTRIAL AND AERIAL VEHICLES," was filed as provisional application 62/923,234 on Oct. 18, 2019, where hybrid integration of MEMS sensor with a photonic gyroscope was described at a module level. That application was converted into non-provisional application Ser. No. 17/071,697 on Oct. 15, 2020, which has been published as U.S. 2021/0116246. All of these applications are incorporated herein by reference. The present disclosure focuses on in-plane integration of the MEMS accelerometer device 30 onto the gyroscope waveguide die 10. In other words, a self-contained inertial measurement unit (IMU) containing photonics optical gyroscope and MEMS accelerometer can be fabricated as a single device on a single die, which is sometimes referred to as SiPhOG-X.

Figure 2A:
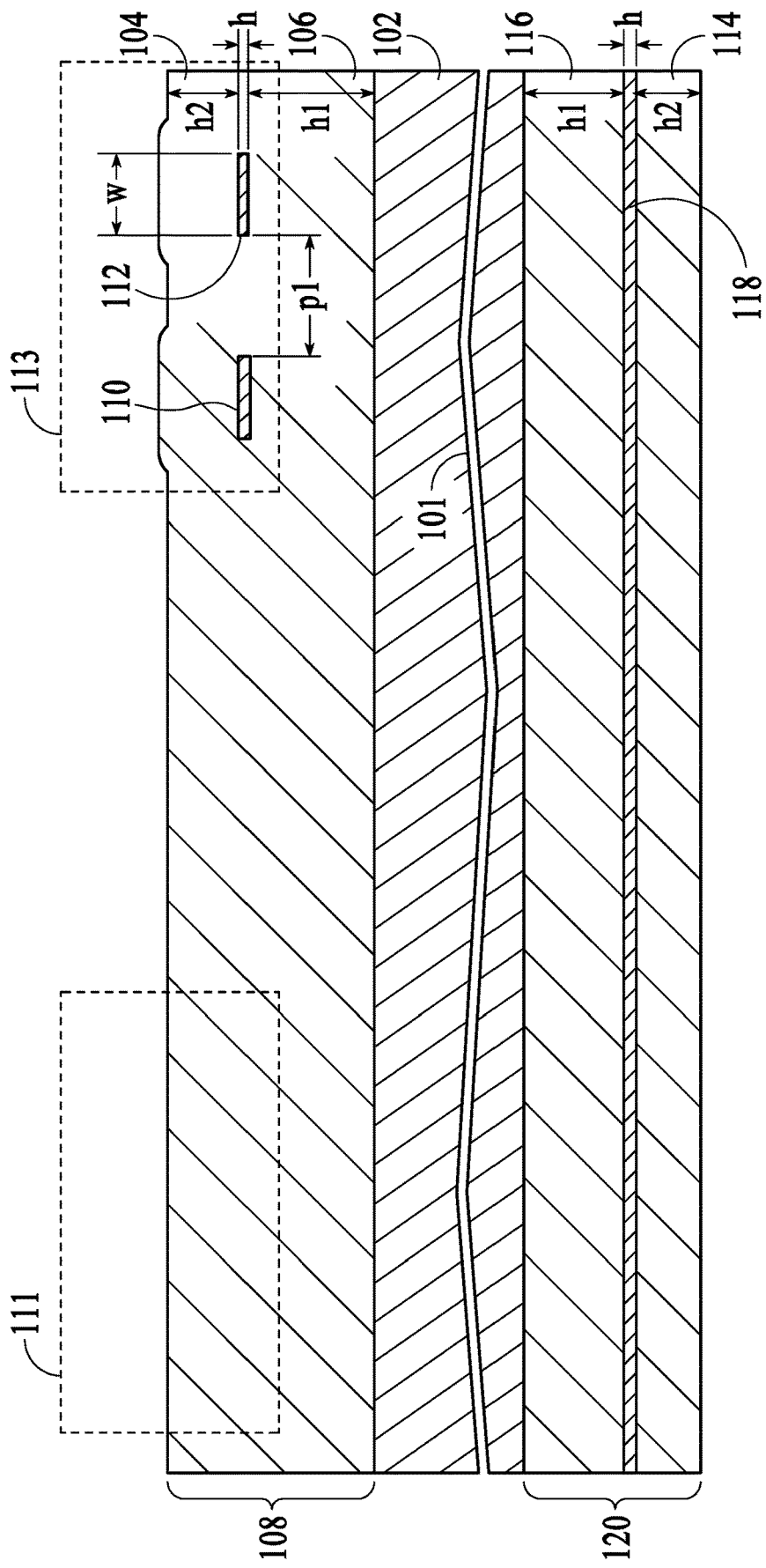
FIGS. 2A-2F show the process flow to monolithically integrate the MEMS accelerometer into the optical gyroscope chip with silicon nitride waveguides, according to an embodiment of the present disclosure.

FIG. 2A shows the cross-sectional view at the starting point of a MEMS-SiPhOG integration process flow. Specifically, FIG. 2A shows a substrate 102, which may be a silicon substrate. The substrate 102 may have a thickness of a standard wafer, e.g., the thickness can be 725 um. Note that the thickness of different material layers are not drawn to scale. However, in order to convey the idea that the substrate 102 is much thicker than the rest of the material layers shown in the FIGS. 2A-2F, the discontinuity 101 is introduced in the middle of the layer 102 just for visualization. The layers 106 and 116 can have a thickness 'h1' in the range of 15 um on both sides of the substrate 102. Layer 106 acts as a lower cladding for the waveguide cores 110 and 112. Note that adjacent waveguide cores 110, 112 correspond to each turn of the waveguide coil 20 shown in FIG. 1. The pitch p1 between the cores may be in the range of 20 um, which can be reduced significantly by introducing structural modification in between the adjacent waveguide cores, as described later with respect to FIG. 4. Waveguide cores 110 and 112 can have a thickness 'h' and width 'w'. Non-limiting exemplary dimensions for 'h' can be 60-100 nm, and 'w' can be 2-3 um. Waveguide cores 110 and 112 are made of silicon nitride (SiN). An upper cladding 104 is formed on top of waveguide cores 110 and 112. The thickness 'h2' of the upper cladding layer 104 can be in the range of 2-3 um. The thickness may be decreased to about 1 um if necessary for the subsequent process flow to create the MEMS accelerometer. Note that when layers 106, 110 (and 112) and 104 are formed on one side of substrate 102, corresponding layers 116, 118 and 114 are also formed on the other side of the substrate 102, even though those layers are not used for waveguiding purposes. Alternatively, those layers can create waveguides in a different layer, if necessary. Both upper and lower claddings 104 and 106 are shown to be of the same material 108, e.g. silicon oxide, though in various embodiments, the lower cladding can be pre-grown oxide and the upper cladding may be deposited oxide, such as TEOS (Tetra Ethyl Ortho Silicate) or other composition. Similarly both layers 114 and 116 have the same material 120 which is identical to material 108. The dashed outline 113 shows area earmarked for the turns of the optical gyroscope coil 20 on the die 10, while the dashed outline 111 shows the area earmarked for subsequent fabrication of the MEMS accelerometer on the same die 10.

Figure 2B:
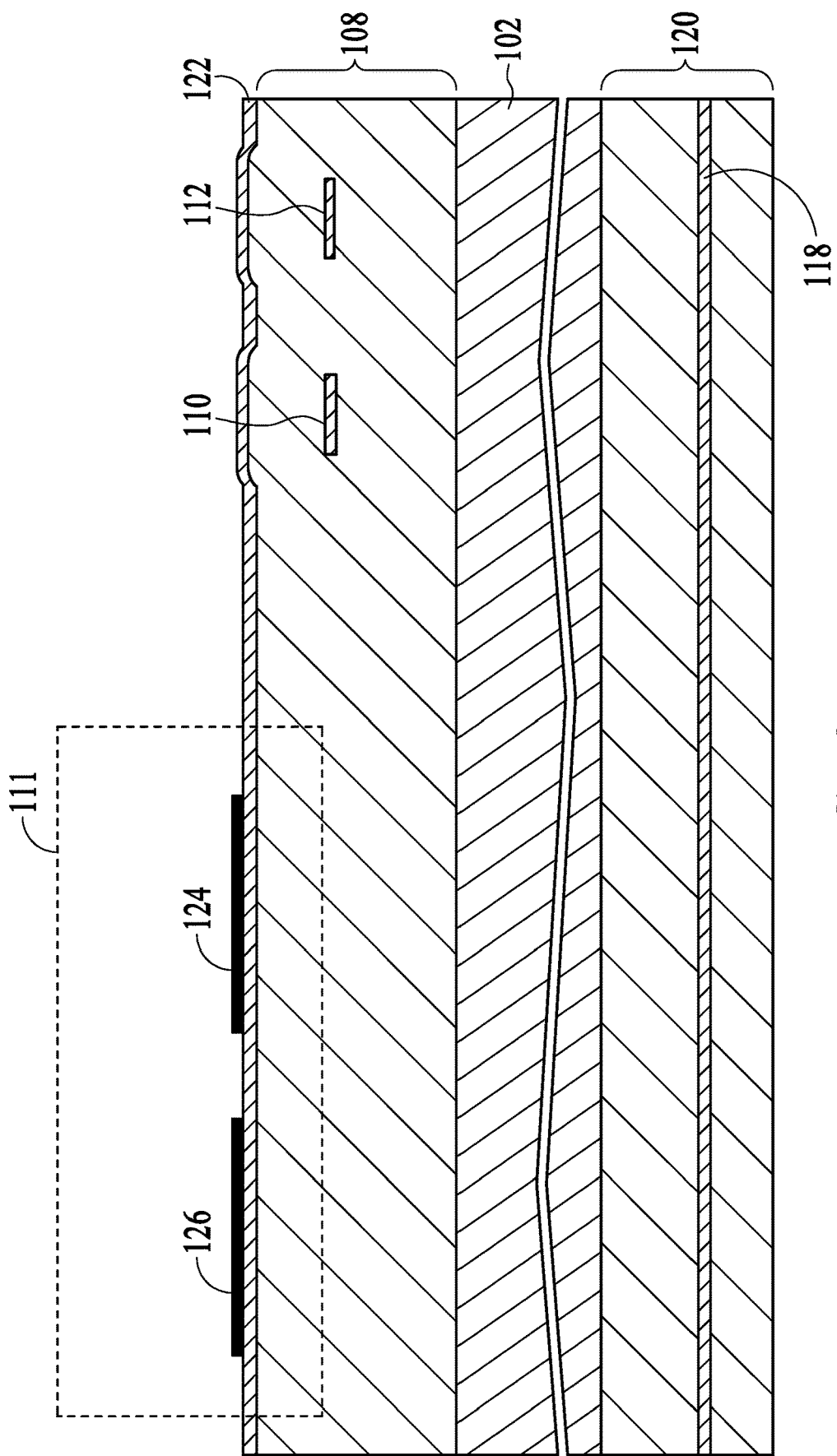

FIG. 2B shows an additional layer 122 of SiN formed on top of the oxide layer 108. This SiN layer 122 acts as an etch stop layer for the MEMS accelerometer fabrication. Electrodes 124 and 126 can be deposited and patterned on top of the layer 122 within the area 111 designated for the MEMS accelerometer.

Figure 2C:
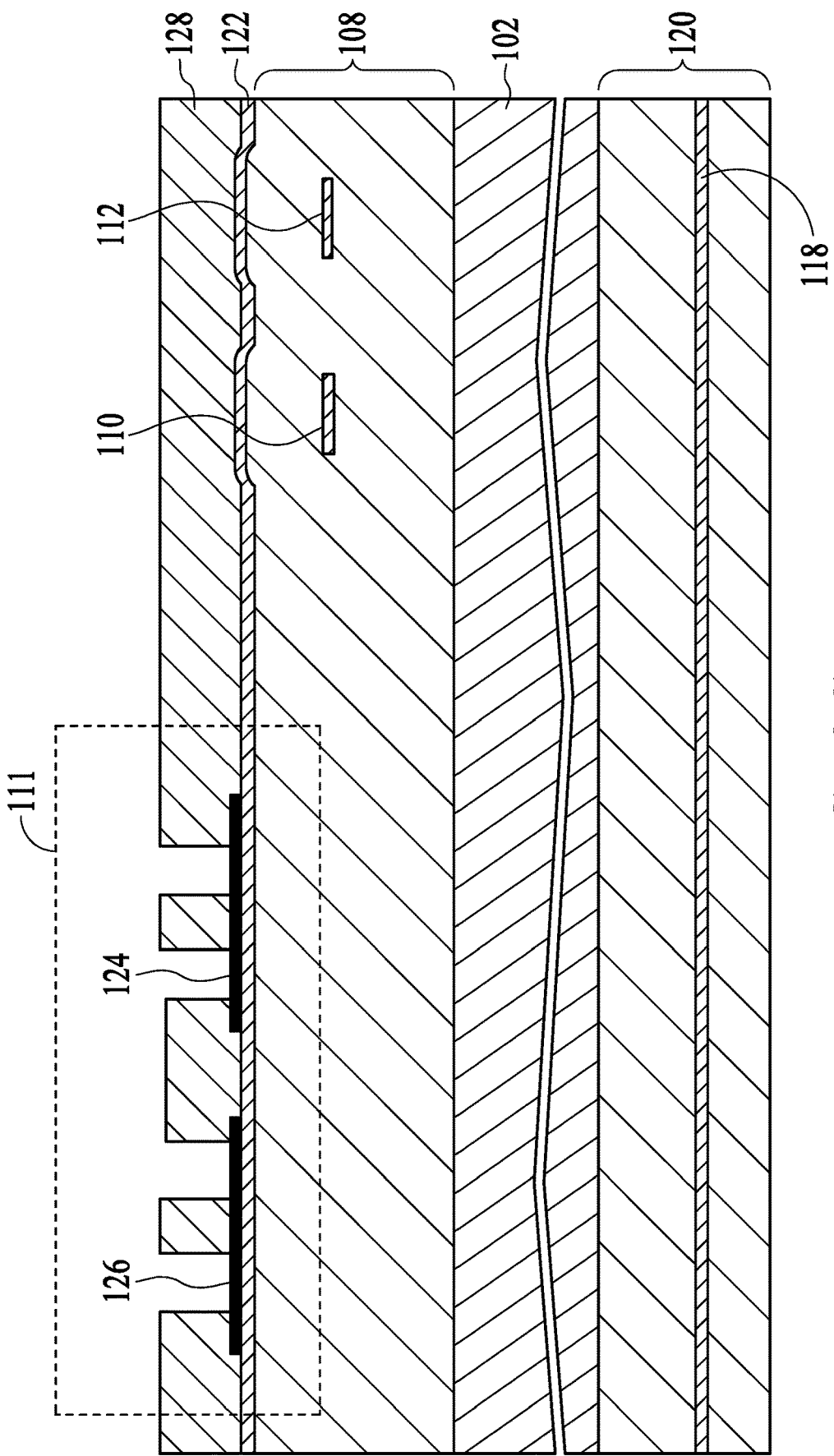

FIG. 2C shows a sacrificial layer 128 deposited and patterned on top of the etch stop layer 122 and the patterned electrodes 126 and 124. Sacrificial layer 128 may be an oxide layer.

Figure 2D:
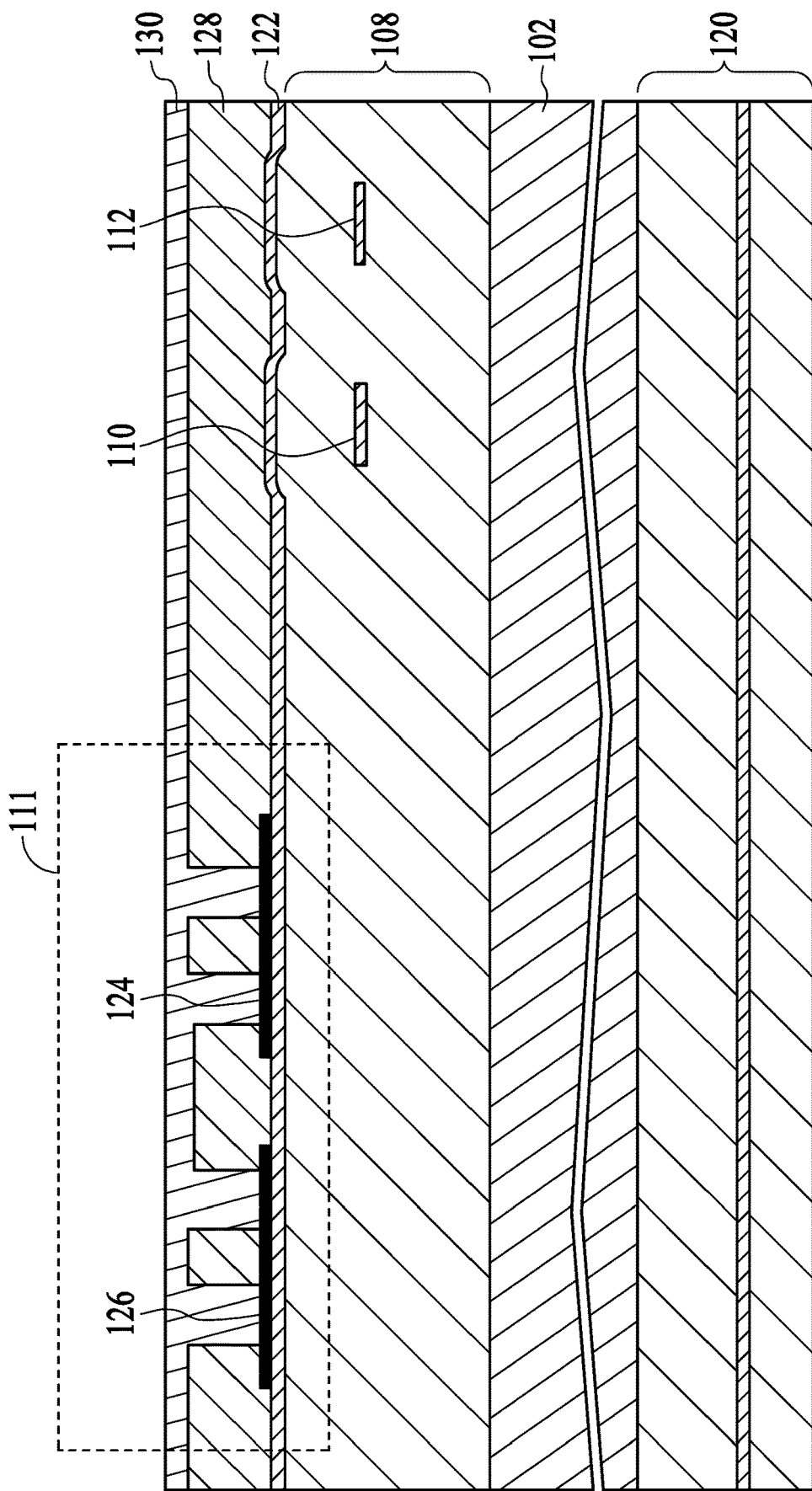

FIG. 2D shows a structural layer 130 deposited and patterned on top of the patterned sacrificial layer 128 and electrodes 126 and 124. Structural layer 130 can be made of poly-silicon-germanium (SiGe). This layer fills the gaps between the patterned sacrificial layer 128.

Figure 2E:
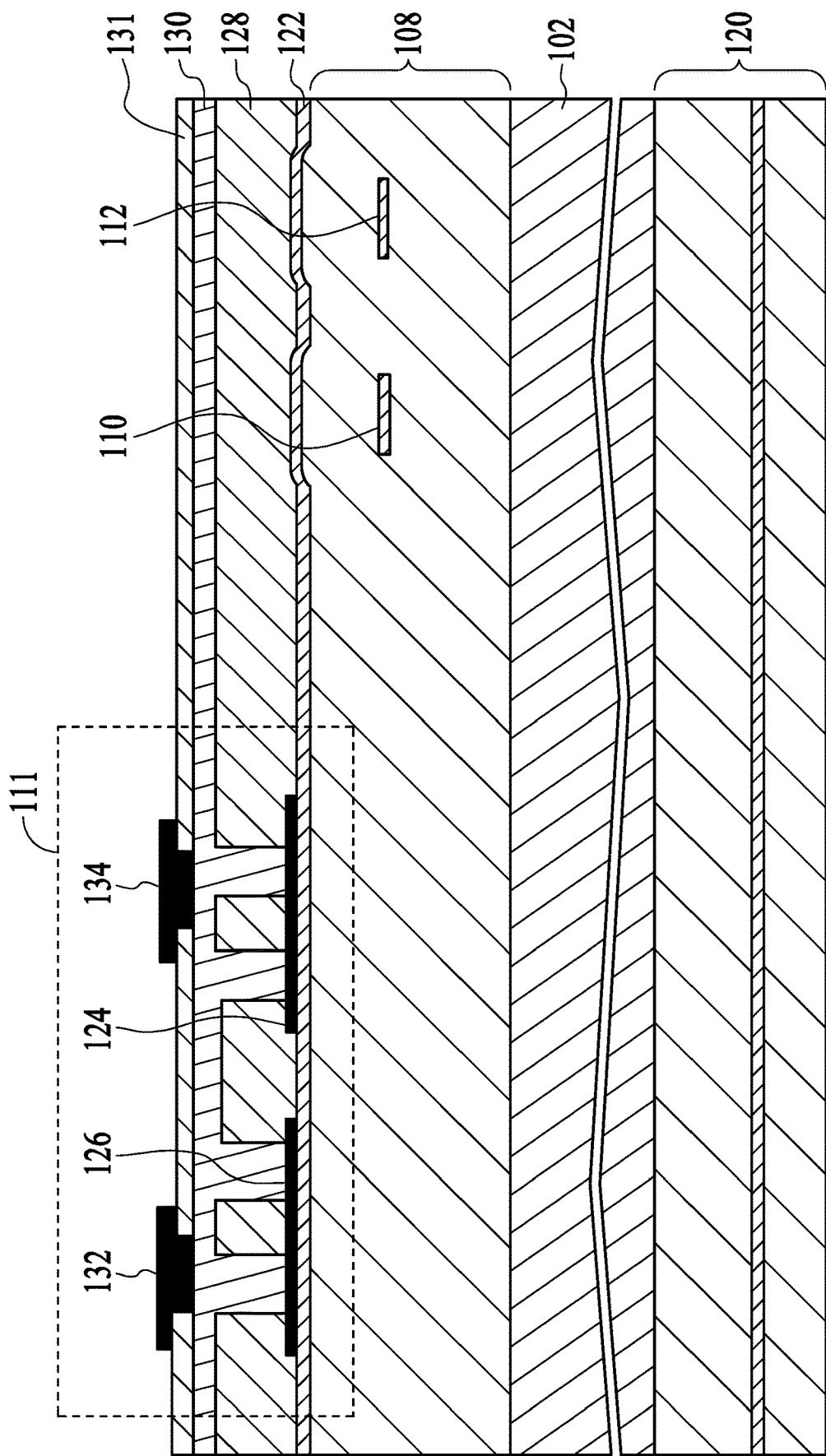

FIG. 2E shows a second sacrificial layer 131 deposited and patterned on top of the structural layer 130. Layer 131 may be the same material as layer 128, e.g. oxide. Bond pads 132 and 134 are formed and patterned on top of the second sacrificial layer 131.

Figure 2F:
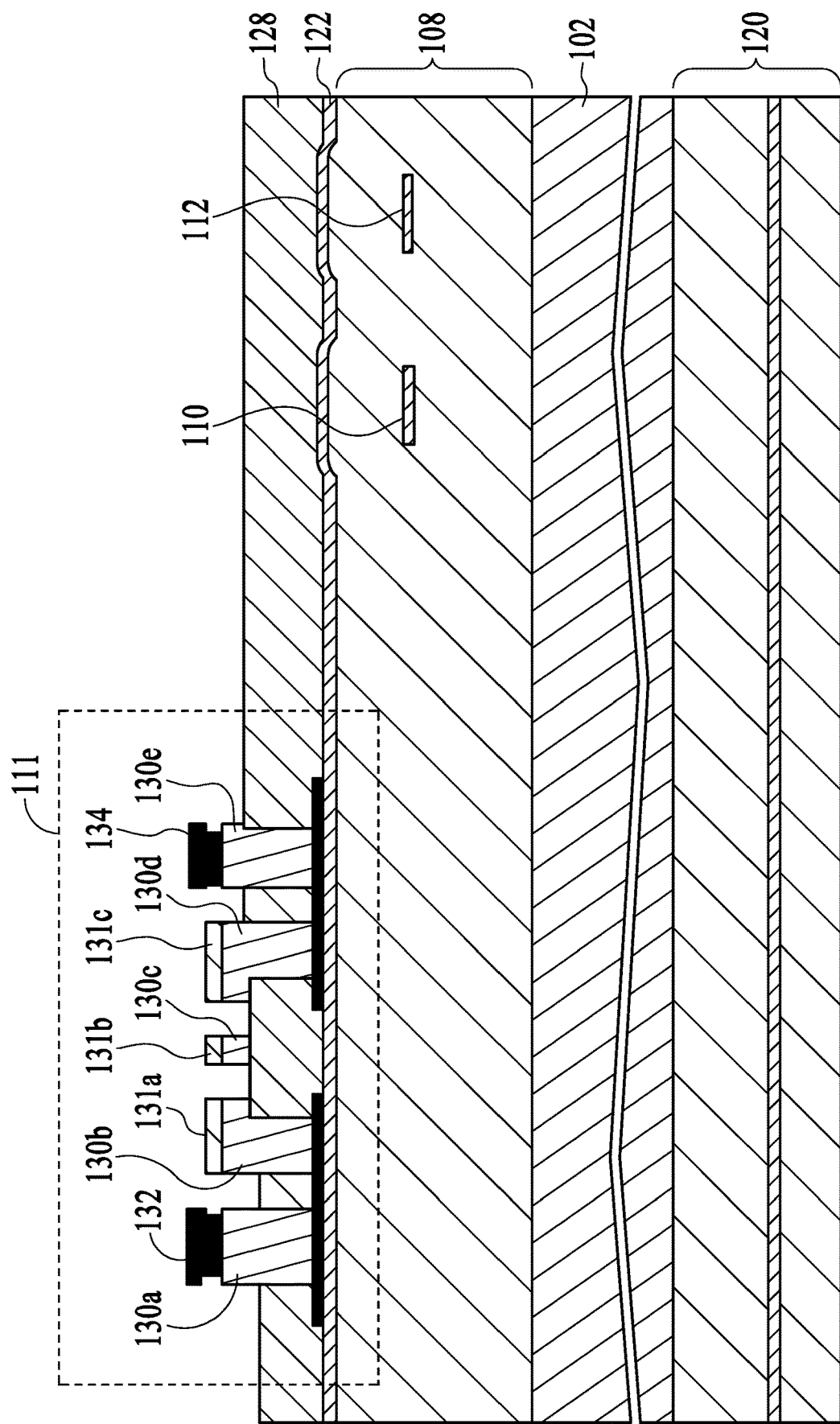

FIG. 2F shows patterning of the structural layer 130 to create columns 130a, 130b, 130c, 130d and 130e within the designated area 111 for the MEMS accelerometer. The second sacrificial layer 131 also gets patterned on top of the columns (131a, 131b, 131c).

Figure 3:
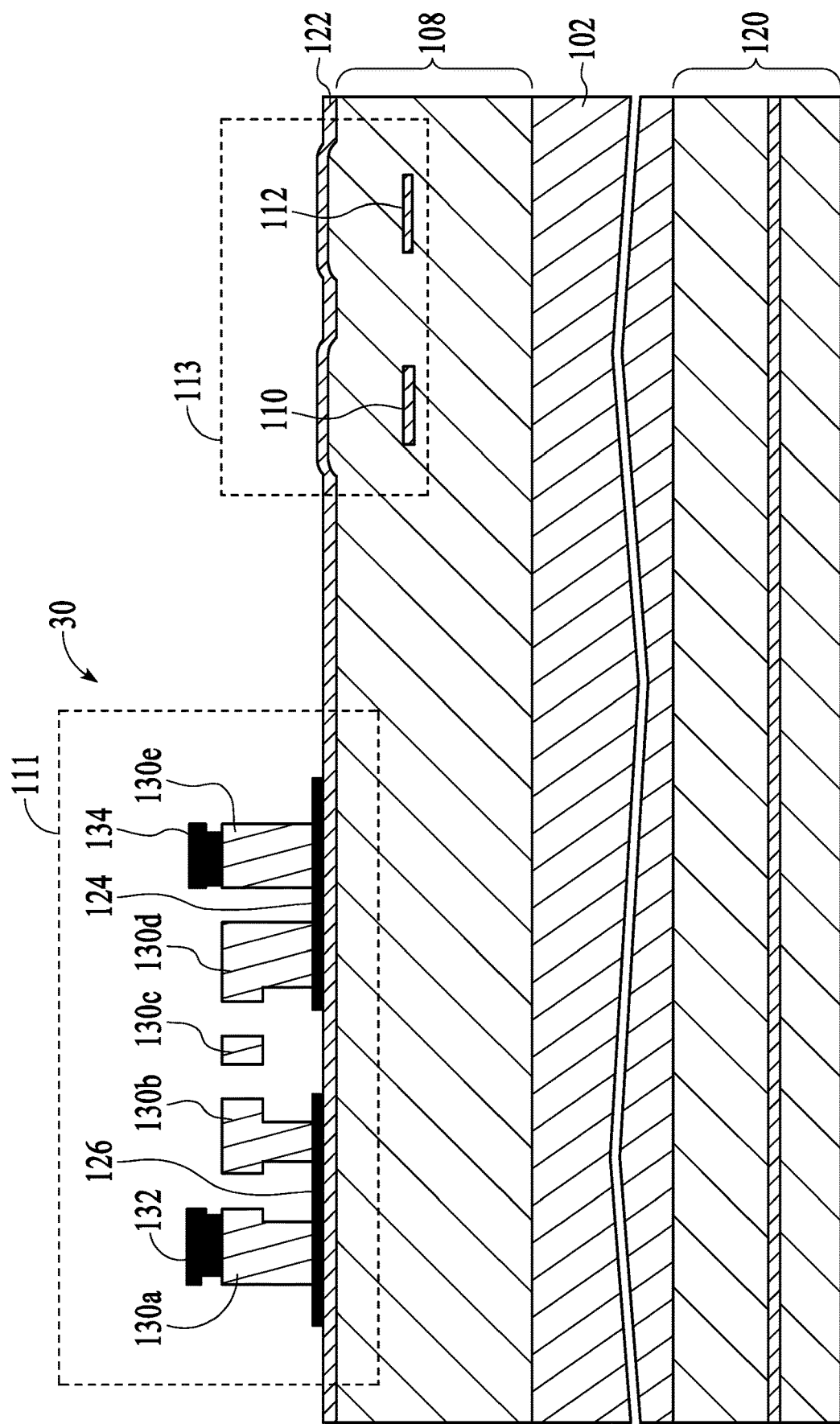
FIG. 3 is a schematic cross-sectional view showing the fully processed integrated device containing the MEMS accelerometer and optical gyroscope, according to an embodiment of the present disclosure.

FIG. 3 shows the MEMS device 30 after the sacrificial layers 128 and 131 are removed, thereby creating the suspending structure 130c in the middle between the surrounding frame denoted by columns 130b and 130d. This freely suspending structure 130c is essential for the operation of the MEMS accelerometer.

Note that each waveguide core 110, 112 corresponds to each turn of the waveguide coil 20 shown in FIG. 1. To maintain single mode and to avoid coupling between adjacent waveguides, a minimum pitch p1 needs to be maintained between the adjacent waveguide cores. A non-limiting example value of p1 can be 14-16 um, or even 20 um. This pitch limits the total serial length of the waveguide on a die 10 (see FIG. 1), and the maximum area enclosed by the waveguide coil 20 is also limited.

Figure 4:
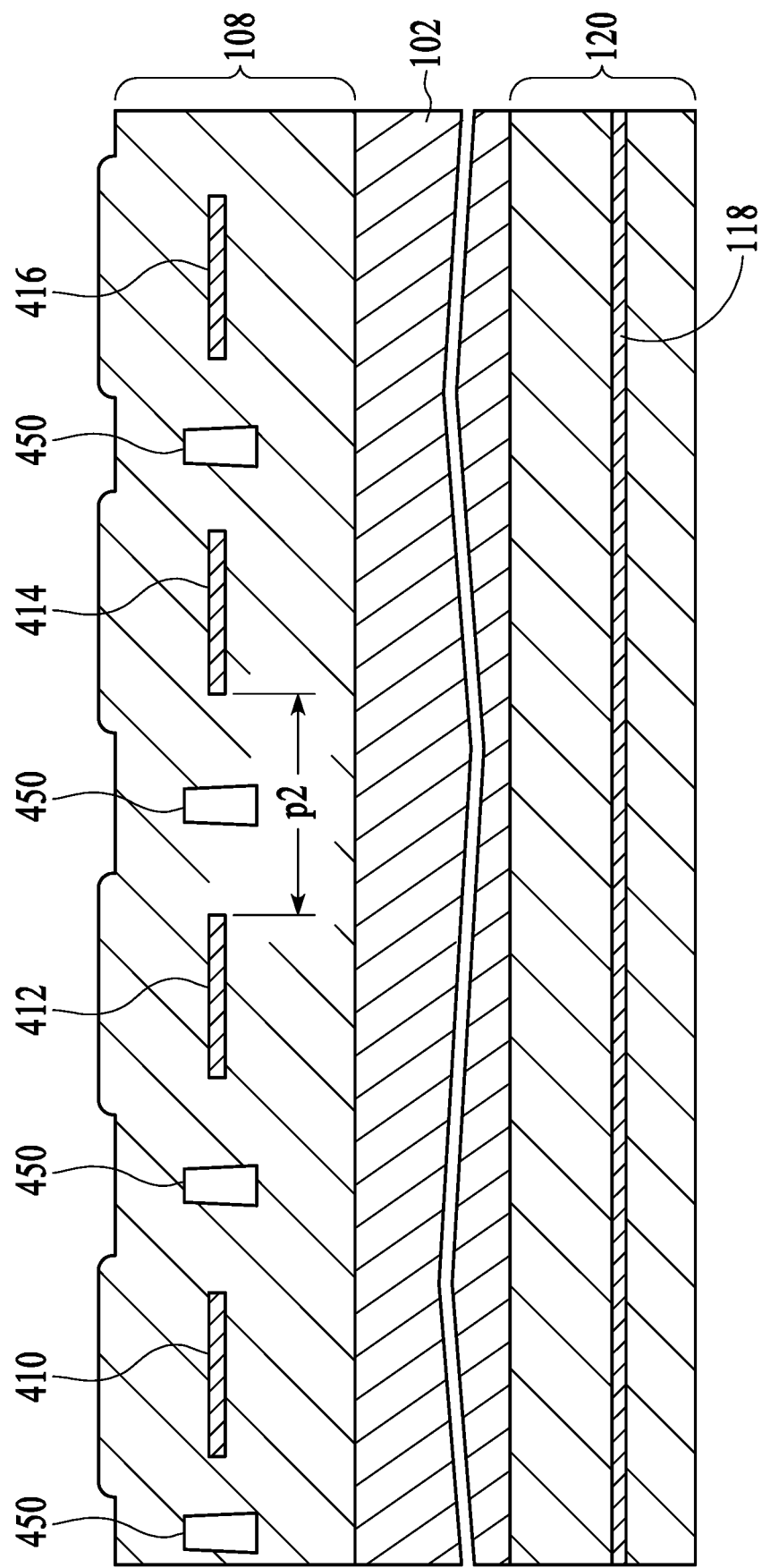
FIG. 4 is a schematic cross-sectional view showing an alternative configuration of the gyroscope waveguide chip (cross-sectional view), which can be the basis for monolithically integrating the MEMS accelerometer, according to an embodiment of the present disclosure.

FIG. 4 shows one approach to mitigating the crosstalk between adjacent waveguides while making the pitch shorter, thereby being able to more densely pack the turns of the waveguide coil 20. The embodiment in FIG. 4 automatically leads to longer total length of the waveguide and a larger enclosed area, that translate to higher sensitivity of the optical gyroscope. Introducing air gaps 450 on both sides of the waveguide cores confines optical modes largely within one turn of the waveguide and prevents leakage of optical signal to the adjacent turn of the waveguide. In other words, the air gaps 450 act as physical isolations between adjacent waveguide cores 410, 412, 414, and 416. As the pitch p2 between two adjacent waveguide cores reduces, automatically more turns can be accommodated within the same reticle field, increasing both the total length and the enclosed area in an individual layer or plane. The pitch p2 can very well be less than 10 um with the air gaps, i.e. much lower than the pitch p1 shown in FIG. 2A. Note that instead of air, the gaps may be filled with other non-reactive fluid, such as an inert gas. Also, instead of air gaps, sub-wavelength grating-like structures or metal barriers can be used in between adjacent waveguides to reduce pitch without increasing cross talk. Note that a MEMS accelerometer can be fabricated on the modified SiN waveguide chip (e.g. with air gaps) much in the same way as described with respect to FIGS. 2A-2F.

Note that one option can be distributing the total length of a SiN waveguide coil with multiple turns (and/or a ring with a single turn) into different vertically separated layers (e.g., two or more layers) that would lead to improved gyro sensitivity without increasing the form factor. Details of a stacked multi-layer gyro configuration are covered in provisional application 62/858,588 filed on Jun. 7, 2019, titled, "Integrated Silicon Photonics Optical Gyroscope on Fused Silica Platform." A follow-up provisional application 62/896,365 filed on Sep. 5, 2019, titled "Single-layer and Multi-layer Structures for Integrated Silicon Photonics Optical Gyroscopes" describes additional embodiments. A third provisional application 62/986,379, titled, "Process Flow for Fabricating Integrated Photonics Optical Gyroscopes," was filed on Mar. 6, 2020. These three applications were combined into a non-provisional application Ser. No. 16/894,120 filed on Jun. 5, 2020, titled "Single-layer and Multi-layer Structures for Integrated Silicon Photonics Optical Gyroscopes" which eventually issued as U.S. Pat. No. 10,969,548 on Apr. 6, 2021. These applications are incorporated herein by reference. In addition, system-level integration of a silicon photonics based front-end chip and a SiN waveguide chip have been covered in provisional applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." These two applications were combined into a non-provisional application Ser. No. 16/659,424 filed on Oct. 21, 2019, titled "System Architecture for Silicon Photonics Optical Gyroscopes" which eventually issued as U.S. Pat. No. 10,731,988 on Aug. 4, 2020. These applications are also incorporated herein by reference.

However, in the above applications, the need to manufacture a two-layer device arose partly because in a single plane, the adjacent waveguides need to be spaced apart at a pitch that prevents unwanted cross-coupling. Therefore, to keep the footprint of the device more or less same, the total length of the waveguide spiral was distributed between more than one planes. This present disclosure provides solutions where adjacent waveguides can be packed more tightly in a single plane, i.e. the pitch between adjacent waveguides is reduced in an individual plane. Note that the terms "layer" and "plane" have been used interchangeably when describing distributing the waveguide coil into multiple planes. Densely packing waveguides on a single plane may obviate the need to fabricate a multi-layer device altogether, or at least can reduce the number of layers necessary to get a suitable total length of waveguide coil that is directly related to the sensitivity of the optical gyroscope.

In summary, incorporating MEMS sensors in the same chip as the photonics optical gyroscope utilizes both the Coriolis force and the Sagnac effect to produce precision inertial sensing, including rotation and acceleration sensing. Even low-precision mechanical gyroscopes can be integrated on the same die for axes that do not need precision optical readout produced by the Sagnac effect gyroscopes. Monolithically integrating SiPhOG and MEMS sensors makes it earlier to bring all the electronic control circuitry for the various sensors on the same chip.

It is noted that some sensing applications may need high-precision optical gyroscope for just one axis to supplement or replace low-precision measurement by a low-cost mechanical gyroscope (such as a MEMS-based gyroscope), while the other two axes may continue to use low-precision measurement from low-cost mechanical gyroscopes. One such example is gyroscopes in safety sensors relied upon by automatic driver assistance systems (ADAS) for current and future generations of autonomous vehicles, especially for Level 2.5/Level 3 (L2.5/L3) markets. In ADAS, high-precision angular measurement may be desired only for Z-axis (the yaw axis) for determining heading, because the vehicle stays on the X-Y plane of a rigid road. The angular measurement for the X and Y axis (pitch and roll axes) may not be safety-critical in this scenario. The present inventors recognize that by bringing down the cost of high precision optical gyroscopes at least for one axis translates to overall cost of reduction of the IMU that would facilitate mass market penetration. Additionally, as needed, the mechanical gyroscopes in the other two axes may also be replaced or supplemented by optical gyroscopes with proper design of system level integration in all 3 axes (pitch, roll and yaw axes), for example in unmanned aerial vehicles (e.g., drones), construction, farming, industrial, marine vehicles, L4/L5 markets and certain military applications.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An integrated photonics chip comprising:
    a waveguide coil comprising a plurality of waveguide turns looping around a central area enclosed by the waveguide coil, each waveguide turn being parallel to adjacent waveguide turns, wherein the waveguide coil is used as a rotational sensing element of an optical gyroscope; and
    a micro-electro-mechanical-systems (MEMS)-based motion sensing device monolithically integrated in the central area enclosed by the waveguide coil, wherein the waveguide coil and the MEMS-based motion sensing device are fabricated on a common platform,
    wherein the common platform is a silicon photonics platform, wherein each waveguide turn comprises a waveguide core sandwiched between an upper cladding and a lower cladding, and the waveguide core comprises silicon nitride and the upper cladding and lower cladding comprise oxide.

2. The integrated photonics chip of claim 1, wherein the optical gyroscope and the MEMS-based motion sensing device are packaged together as a modularized integrated inertial measurement unit (IMU).

3. The integrated photonics chip of claim 2, wherein the MEMS-based motion sensing device provides coarse rotational sensing reading for all axes of motion, and the optical gyroscope provides a higher-precision rotational sensing reading for one or more selected axes of motion.

4. The integrated photonics chip of claim 2, wherein the MEMS-based motion sensing device comprises an accelerometer for one or more axes of motion.

5. The integrated photonics chip of claim 1, further comprising:
a structural modification introduced on either side of each waveguide turn to reduce crosstalk between the adjacent waveguide turns, thereby increasing a spatial density of waveguide turns that can be fabricated within a predetermined area of the integrated photonics chip, wherein the structural modification comprises a gap along a lateral dimension of an oxide layer that constitutes the upper cladding and the lower cladding sandwiching the waveguide core on the silicon photonics platform.

6. The integrated photonics chip of claim 5, wherein the predetermined area depends on an exposure field of a reticle used to fabricate the waveguide coil and the MEMS-based motion sensing device.

7. The integrated photonics chip of claim 5, wherein increasing spatial density of waveguide turns increases the central area enclosed within the waveguide coil, as well as increases a number of waveguide turns enclosing the central area, thereby increasing sensitivity of the rotational sensing element.

8. The integrated photonics chip of claim 5, wherein the structural modification comprises a gap.

9. The integrated photonics chip of claim 8, wherein the gap comprises one of: an air gap, a gap filled with metal, or, a gap filled with an inert gas or liquid.

10. The integrated photonics chip of claim 8, wherein the gap is in a form of a high-aspect-ratio rectangular slit or trench with a longitudinal dimension of the gap being substantially higher than a lateral dimension of the gap, such that the gap extends substantially above and below the waveguide core along a direction of the longitudinal dimension.

11. The integrated photonics chip of claim 1, wherein a first portion of the waveguide coil resides on a first plane and a second portion of the waveguide coil resides on a second plane, wherein the first plane and the second plane are vertically stacked above one another.

12. The integrated photonics chip of claim 11, wherein light couples evanescently between the first portion of the waveguide coil on the first plane and the second portion of the waveguide coil on the second plane.

* * * * *